US010846234B2

(12) United States Patent
Saito et al.

(10) Patent No.: US 10,846,234 B2
(45) Date of Patent: Nov. 24, 2020

(54) STORAGE CONTROL SYSTEM AND STORAGE CONTROL METHOD (71) Applicant: HITACHI, LTD., Tokyo (JP)

(72) Inventors: Yusuke Saito, Tokyo (JP); Toshiya Seki, Tokyo (JP); Eiju Katsuragi, Tokyo (JP); Yutaka Ohshima, Tokyo (JP); Katsuya Sato, Tokyo (JP); Noboru Morishita, Tokyo (JP); Yoshihiro Yoshii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/354,787

(22) Filed: Mar. 15, 2019

(65) Prior Publication Data
US 2019/0377684 A1 Dec. 12, 2019

(30) Foreign Application Priority Data

Jun. 7, 2018 (JP) ................................. 2018-109888

(51) Int. Cl.
G06F 12/10 (2016.01)

(52) U.S. Cl.
CPC ........ G06F 12/10 (2013.01); G06F 2212/657 (2013.01)

(58) Field of Classification Search
CPC .................................................... G06F 12/10
See application file for complete search history.

(56) References Cited

U.S. PATENT DOCUMENTS

| 2002/0184556 | A1* | 12/2002 | Hashemi | G06F 11/1076 |
| | | | | 714/5.11 |
| 2011/0197023 | A1* | 8/2011 | Iwamitsu | G06F 12/0292 |
| | | | | 711/114 |
| 2013/0031307 | A1 | 1/2013 | Itoh | |
| 2014/0195725 | A1* | 7/2014 | Bennett | G06F 12/06 |
| | | | | 711/103 |
| 2015/0378629 | A1 | 12/2015 | Suzuki et al. | |
| 2019/0050602 | A1* | 2/2019 | Sela | G11C 16/22 |

FOREIGN PATENT DOCUMENTS

| JP | 2013-025692 A | 2/2013 |
| WO | 2014/188479 A1 | 11/2014 |

OTHER PUBLICATIONS

Japanese Office Action dated Mar. 17, 2020 for the Japanese Patent Application No. 2018-109888.

* cited by examiner

Primary Examiner — Edward J Dudek, Jr.
(74) Attorney, Agent, or Firm — Volpe Koenig (57) ABSTRACT A storage control system reads a data set from a storage apparatus if necessary in response to an I/O request. A data set contains data and an address. The storage control system performs an all-type address check which is a check to determine whether one of a first address and second address which correspond to a read-target data set in address translation information, which is information indicating a mapping relationship between one or more first addresses and one or more second addresses, matches the address among the data and address contained in the data set. The one or more first addresses are each an address which belongs to the first address type. The one or more second addresses are each an address which belongs to the second address type. The storage control system performs processing according to the I/O request when the result of the all-type address check is true.

11 Claims, 6 Drawing Sheets

ADDRESS MANAGEMENT TABLE
400

| Page ID | MIXTURE FLAG MAP |
|---|---|
| 001 | 011000... |
| 002 | 000000... |
| ... | ... |

STORAGE CONTROL SYSTEM AND STORAGE CONTROL METHOD

CROSS-REFERENCE TO PRIOR APPLICATION

This application relates to and claims the benefit of priority from Japanese Patent Application number 2018-109888, filed on Jun. 7, 2018 the entire disclosure of which is incorporated herein by reference.

BACKGROUND

The present invention generally relates to storage control.

As technology relating to storage control, the technology disclosed in PTL 1, for example, is known. PTL 1 discloses 'a storage server which stores data together with write commands sent from a computer, comprising a memory which stores a job management table in which, upon receiving a write command, a write job corresponding to the write command is registered; a cache memory which temporarily stores data together with the write command, a storage drive which records the data stored in the cache memory on a storage medium based on the write job which has been registered in the job management table, and a controller which determines a load state of the storage server based on a cumulative number of write jobs which has been acquired from the job management table and which controls timing with which a write command completion report is output to the computer based on the determined load state.'

[PTL 1] Japanese Laid-Open Patent Application Publication No. 2013/025692.

SUMMARY

Incidentally, generally speaking, the plurality of storage areas which are managed by a storage control system (for example, a plurality of logical volumes) exist hierarchically or transversely. In a storage control system, address translation information indicating an address mapping relationship (mapping between addresses) between storage areas which exist hierarchically or transversely is managed. A first address which belongs to one storage area can be converted to a second address which belongs to another storage area based on the address translation information. The first address is an address which belongs to a first address type and the second address is an address which belongs to a second address type.

Data reliability can be maintained by means of error correction using an ECC (Error Correcting Code) which is appended to data. However, the reliability of mapping between addresses cannot be maintained by using an ECC.

A storage control system reads a data set from a storage apparatus if necessary in response to an I/O (Input/Output) request. A data set contains data and an address. The storage control system performs an all-type address check which is a check to determine whether one of a first address and second address which correspond to a read-target data set in address translation information, which is information indicating a mapping relationship between one or more first addresses and one or more second addresses, matches the address among the data and address contained in the data set. The one or more first addresses are each an address which belongs to the first address type. The one or more second addresses are each an address which belongs to the second address type. The storage control system performs processing according to the I/O request when the result of the all-type address check is true.

According to the present invention, the reliability of mapping between addresses can be maintained.

DESCRIPTION OF EMBODIMENTS

In the ensuing explanation, 'interface unit' may be one or more interfaces. The one or more interfaces may be one or more communication interface devices of the same type (for instance, one or more NIC (Network Interface Cards)) or may be two or more communication interface devices of different types (for instance, an NIC and an HBA (Host Bus Adapter)).

Furthermore, in the ensuing explanation, 'memory unit' is one or more memories and may, typically, be a main storage device.

Furthermore, in the ensuing explanation, 'PDEV unit' is one or more PDEV and may, typically, be an auxiliary storage device. 'PDEV' is an example of a storage device and in particular signifies a physical storage device (Physical storage DEVice) and is typically a nonvolatile storage device.

Furthermore, in the ensuing explanation, 'storage unit' is at least one of a memory unit and at least a portion of a PDEV unit (typically, at least a memory unit).

Furthermore, in the ensuing explanation, 'processor unit' is one or more processors. At least one processor is typically a microprocessor like a CPU (Central Processing Unit) but may also be another type of processor such as a GPU (Graphics Processing Unit). At least one of the processors may be a single-core or multi-core processor. At least one of the processors may be a processor in a broader sense such as a hardware circuit which performs some or all of the processing (an FPGB (Field-Programmable Gate Array) or ASIC (Application Specific Integrated Circuit), for example).

Moreover, although information for which an output is obtained for an input is explained in the ensuing explanation by using expressions such as 'xxx table,' information of this type could also be data of any structure or could be a learning model such as a neural network which generates an output for the input. Therefore, 'xxx table' can be referred to as 'xxx information.' Moreover, in the ensuring explanation, the configuration of each table is an example, and one table may be divided into two or more tables, or all or a portion of two or more tables could also be one table.

Furthermore, in the ensuing explanation, although functions are sometimes explained by means of the expression 'kkk unit' (excluding the interface unit, storage unit and processor unit), the functions may also be realized as a result of one or more computer programs being executed by a processor unit or may be realized by one or more hardware circuits (for example, an FBGA or ASIC). When the functions are realized as a result of programs being executed by a processor unit, determined processing is performed while suitably using a storage unit and/or an interface unit, and the like, and hence the functions may be implemented by at least a portion of a processor unit. Processing which is explained with the function serving as the subject of the sentence may be processing that is performed by a processor unit or an apparatus which comprises the processor unit. A program may be installed from a program source. A program source may, for example, be a program distribution computer or a computer-readable recording medium (for example, a non-temporary recording medium). The explanation of each function is an example, and a plurality of functions may be incorporated into one function or one function may be divided into a plurality of functions.

Furthermore, in the ensuing explanation, 'redundancy configuration group' is a storage device group which is configured from two or more storage devices and which stores redundant data. Redundancy configuration examples include Erasure Coding, RAIN (Redundant Array of Independent Nodes), internode mirroring, RAID (Redundant Array of Independent (or Inexpensive) Disks) and so forth, and any redundancy configuration may be adopted. Therefore, 'storage device' may be a storage medium such as an NVRAM (Non-Volatile RAM) or may be a node which is a constituent element of a scale-out-type storage system (a general-purpose computer, for example). Furthermore, a 'storage system' may be a storage system which comprises a plurality of storage media as the plurality of storage devices or may be a storage system which comprises a plurality of nodes as the plurality of storage devices (a scatter storage system, for example). In the embodiment hereinbelow, the storage system is the former storage system, and the storage control system for the former storage system may be a controller in the storage system. For the latter storage system, the storage control system may be a processor unit which executes a predetermined program in each node. More specifically, for example, the 'storage system' may be a system which comprises one or more physical computers. A physical computer may be a general-purpose computer or a dedicated computer. In at least one physical computer, one or more virtual computers (VM (Virtual Machines), for example) may be executed. A virtual computer may be a computer which issues I/O requests or a computer which performs data I/Os in response to I/O requests. As a result of a physical computer executing predetermined software, SDx (Software-Defined anything) may be constructed in the physical computer or in a system which comprises this physical computer. As SDx, SDS (Software Defined Storage) or SDDC (Software-defined Datacenter), for example, can be adopted. For example, an SDS storage system may be constructed as a result of software which comprises a storage function being executed by a physical, general-purpose computer. Furthermore, at least one physical computer (storage server, for example) may execute one or more virtual computers as a host computer and a virtual computer as a storage control system of the storage system (typically, an apparatus which inputs and outputs data to the PDEV unit in response to an I/O request). In other words, at least one physical computer may comprise both a function serving as at least a portion of the host computer and a function serving as at least a portion of the storage system.

An embodiment will be explained hereinbelow. Note that, in the ensuing explanation, 'LA' is an abbreviation for logical address.

Figure 1:
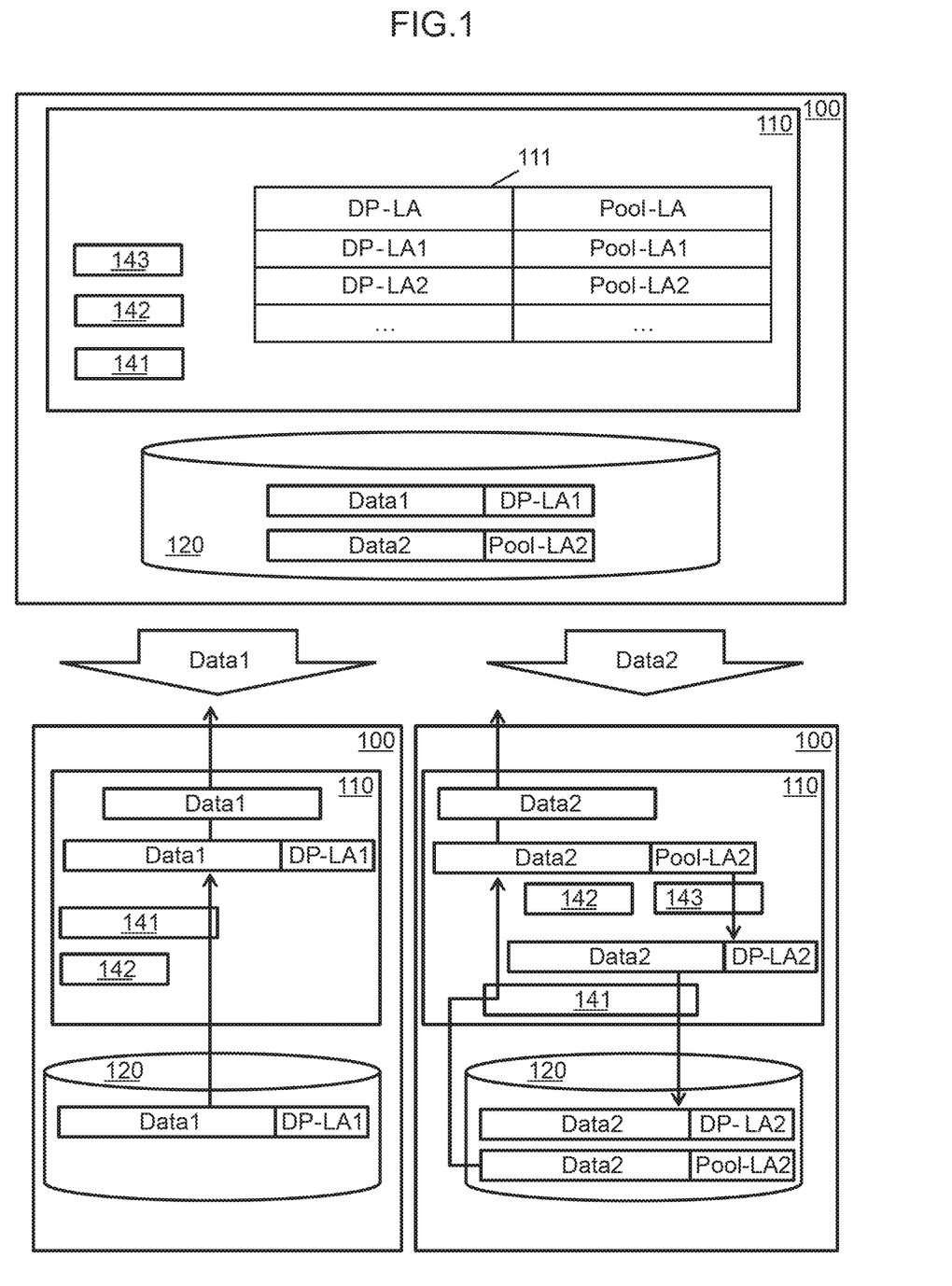
FIG. 1 is a schematic diagram showing an overview of the embodiment.

FIG. 1 is a schematic diagram showing an overview of an embodiment.

A storage system 100 comprises a storage apparatus 120 and a storage control system 110 which controls data I/O (Input/Output) to/from the storage apparatus 120.

The storage control system 110 comprises an I/O control unit 141, an LA checking unit 142 (an example of an address checking unit), a replacement control unit 143, and an address translation table 111 (an example of address translation information).

The address translation table 111 shows the mapping relationship between one or more DP-LA and one or more Pool-LA. A DP-LA is an example of a first address which is an address belonging to the first address type. A Pool-LA is an example of a second address which is an address belonging to the second address type. Note that 'DP' is an abbreviation for Dynamic Provisioning. Dynamic Provisioning is also called Thin Provisioning. In this embodiment, a DP-VOL (a virtual logical volume supporting Dynamic Provisioning) is provided as a logical volume. A DP-VOL is configured from a plurality of pages. Furthermore, in this embodiment, a pool which is configured from a plurality of segments which can be allocated to a plurality of pages is prepared. Pages and segments are both logical storage areas. One or more segments can be allocated to a single page. Furthermore, in the address translation table 111, sets of DP-LA and Pool-LA are registered in predetermined units (page units, for example) and mapping in units smaller than the predetermined units may be specified by means of a computer based on predetermined unit mapping.

The I/O control unit 141 reads a data set from the storage apparatus 120 if necessary in response to an I/O request. The source issuing the I/O request may be a host system, described subsequently, or may be an internal program (a program which executes data copying between logical volumes, for example). Furthermore, in this embodiment, a 'data set' is a set of data and additional information which is information that is added to the data. The data set, data and additional information may each be of a predetermined size. For example, the data is 512 bytes and the additional information is 8 bytes, and so the data set is a total of 520 bytes. The additional information includes at least an LA. The additional information may also include information other than the LA, such as an ECC (Error Correcting Code), for example. Furthermore, 'if necessary' means that reading from the storage apparatus 120 does not necessarily occur in response to an I/O request, and it may be the case, for example, that even if the I/O request is a read request, a read-target data set exists in the cache memory. Conversely, even if the I/O request is a write request, a data set may be read from the storage apparatus 120 as in a case where a so-called read-modify-write is generated.

The LA checking unit 142 performs an all-type LA check which is a check to determine whether one of the DP-LA and Pool-LA in the address translation table 111, which correspond to a read-target data set, matches the LA contained in the data set. When the result of the all-type LA check is true, processing according to the I/O request (for example, actually reading the data set from the storage apparatus 120) is performed.

According to this embodiment, an LA which belongs to the reading source of the data in the data set (the storage area where same is stored) is included in the additional information of the read-target data set, and an all-type LA check to determine whether one of the DP-LA and Pool-LA which correspond to the read-target data set (the DP-LA and Pool-LA in the address translation table 111) matches this LA is performed. As a result, reliability of mapping between addresses can be maintained.

More specifically, according to the address translation table 111 illustrated in FIG. 1, the DP-LA1 and Pool-LA1 have been mapped to each other and the DP-LA2 and Pool-LA2 have been mapped to each other. Furthermore, in the storage apparatus 120 illustrated in FIG. 1, there exist a data set containing Data1 (data) and DP-LA1 (LA) and a data set containing Data2 and Pool-LA2. Therefore, according to this embodiment, the mixing of LA of different address types in the storage apparatus 120 is allowed.

Here, a read-target data set is taken to be a data set which contains Data1 and DP-LA1. In the foregoing case, in an all-type LA check, the DP-LA1 in the data set matches the DP-LA1 among the DP-LA1 and Pool-LA1. Therefore, processing according to the read request in which the data set is the read target is executed. More specifically, for example, Data1 is returned by the I/O control unit 141 to the source of the read request.

Likewise, a read-target data set is taken to be a data set which contains DP-LA2 and Pool-LA2. In the foregoing case, in an all-type LA check, the Pool-LA2 in the data set matches the Pool-LA2 among the DP-LA2 and Pool-LA2. Therefore, processing according to the read request in which the data set is the read target is executed. More specifically, for example, Data2 is returned by the I/O control unit 141 to the source of the read request.

When the matching address in the all-type LA check is any Pool-LA, the replacement control unit 143 replaces (switches) the Pool-LA in the read-target data set with the DP-LA which corresponds to the Pool-LA. According to the illustrated example, the replacement control unit 143 replaces the Pool-LA2 in the read-target data set with the DP-LA2 which corresponds to this Pool-LA2. Furthermore, the I/O control unit 141 writes a data set containing Data2 (the data contained in the read-target data set) and DP-LA2 (the LA after replacing the Pool-LA2 contained in the read-target data set) to the storage apparatus 120 as a post-update data set of the read-target data set. As a result, there is an increase in the DP-LA in place of the Pool-LA in the storage apparatus 120 and consequently the frequency with which the all-type LA check is required is reduced and, as a result, read processing performance improvements can be expected.

Moreover, the following may also be said, for example, of this embodiment.

In this embodiment, a data set (a data set containing data in which all bits are 0, for example) is written to each unit area in the pool (520-byte storage areas of the same size as the data set, for example) in background format, but the LA in all written data sets are Pool-LA. For example, when the pool is created based on the logical storage space provided by the storage apparatus 120, a data set containing the Pool-LA to which the unit area belongs is written to each unit area in the pool. That is, the LA in the storage apparatus 120 are initially only the Pool-LA.

However, the LA designated by the I/O request is a DP-LA. This is because a DP-VOL is provided as a front-end logical storage area and the pool is a back-end logical storage area.

In the foregoing case, according to a comparative example, replacing the DP-LA in the data set with the Pool-LA for each data set that is written to the storage apparatus by a dedicated interface controller which is coupled to the storage apparatus may be considered. The reason for performing such replacement is so that the LA in the storage apparatus are integrated with the Pool-LA and the reason the interface controller performs this replacement is that the processing load is high when such replacement is performed by a microprogram and that there is a risk of inducing a drop in the I/O performance.

However, it is thought that dependence on hardware circuitry such as the interface controller means low versatility. For example, it is hard to render a storage system a Software-Defined system.

Moreover, depending on the storage system (depending on the protocol between the storage control system and storage apparatus, for example), such an interface controller is sometimes not built in. In the foregoing case, it may be necessary for the microprogram to perform the replacement of the DP-LA with the Pool-LA. There is a risk of inducing a drop in I/O performance when the microprogram performs this replacement for each data set that is written to the storage apparatus.

Therefore, according to this embodiment, as mentioned earlier, mixing LA of different address types in the storage apparatus 120 is allowed and an all-type LA check to determine whether one of the DP-LA and Pool-LA which correspond to the read-target data set matches the LA included in this data set is performed.

Moreover, according to this embodiment, as mentioned earlier, because there is an increase in the DP-LA in the storage apparatus 120 in place of the Pool-LA, the frequency with which the all-type LA check is required is reduced and, as a result, read processing performance improvements can be expected.

This embodiment will be explained in detail hereinbelow.

Figure 2:
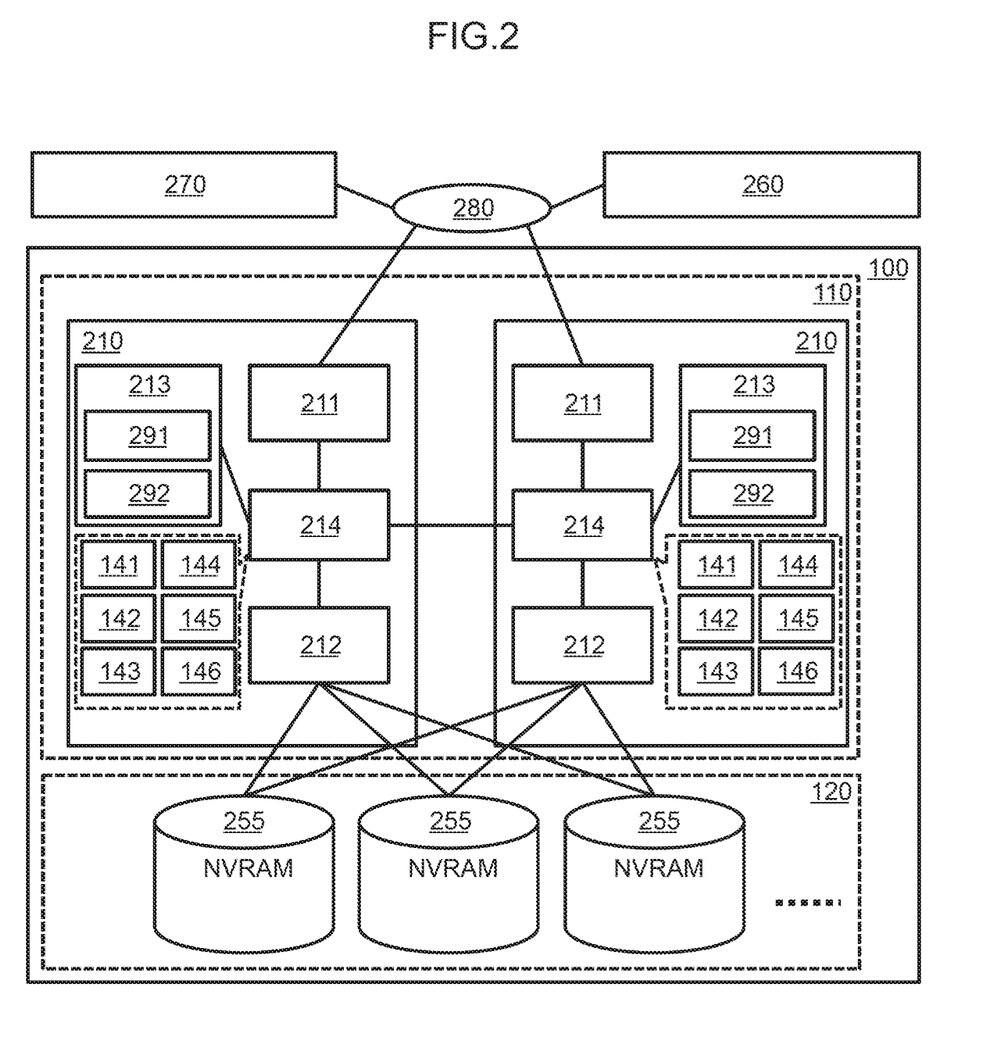
FIG. 2 is a block diagram showing a configuration of the whole system including the storage system.

FIG. 2 shows a configuration of the whole system including the storage system 100.

The storage system 100, a host system 260 and a management system 270 are coupled to a network 280. The host system 260 may be one or more physical or virtual computers and issues an I/O request to the DP-VOL provided by the storage system 100. The management system 270 may be one or more physical or virtual computers and manages the storage system 100. A user (typically an administrator) is able to perform pool creation on the storage control system 110 via the management system 270. The network 280 may be one or more networks which are configured from a fibre channel, ethernet (registered trademark) Infiniband or LAN (Local Area Network) or the like.

The storage system 100 comprises a plurality of NVRAM (Non-Volatile RAM) 255, and a storage control system 110 which controls I/O to/from the plurality of NVRAM 255.

Each NVRAM 255 is an example of a storage device and is a device with a nonvolatile semiconductor memory. The memory may be flash memory, PRAM (Phase-change Random Access Memory), MRAM (Magnetoresistive Random Access Memory), ReRAM (Resistive Random-Access Memory) or FeRAM (Ferroelectric Random-Access Memory).

The storage control system 110 is a redundant storage controller 210, for example. The storage controller 210 comprises an FE (Front-end) interface 211, a BE (Back-end) interface 212, a memory 213, and a CPU 214 which is coupled to the FE interface 211, BE interface 212, and memory 213. The FE interface 211 and BE interface 212 are one example of an interface unit. The memory 213 is one example of a memory unit. The CPU 214 is one example of a processor unit.

The FE interface 211 is coupled to the network 280 and is an interface device for communicating with external apparatuses (the host system 260 and management system 270) of the storage system 100. The BE interface 212 is an interface device for communicating with the NVRAM 255. The communications protocol between the BE interface 212 and the NVRAM 255 is NVMe, for example.

The memory 213 may be configured from volatile semiconductor memory such as SRAM (Static RAM (Random Access Memory)) or DRAM (Dynamic RAM) and the like. The memory 213 comprises cache memory (not shown). The memory 213 stores a plurality of programs including a microprogram 291, and a table group 292 which is one or more tables (an example of management information). The table group 292 comprises the aforementioned address translation table 111, and an address management table (an example of address management information) which will be described subsequently.

The CPU 214 administers operational control of the whole storage controller 210 by executing a program in the memory 213. For example, as a result of the CPU 214 executing the microprogram 291, functions such as the I/O control unit 141, LA checking unit 142, replacement control unit 143, I/O request control unit 144, mixed state management unit 145, and LA management unit 146 are realized. The LA checking unit 142, I/O control unit 141 and replacement control unit 143 are as described above. The I/O request control unit 144 receives an I/O request and issues an inquiry in which the read source address is designated. In response to the inquiry, the mixed state management unit 145 replies that a mixture is present or a mixture is not present. The LA management unit 146 acquires the LA from the address translation table 111. Details of each of the functions will be described subsequently.

Figure 3:
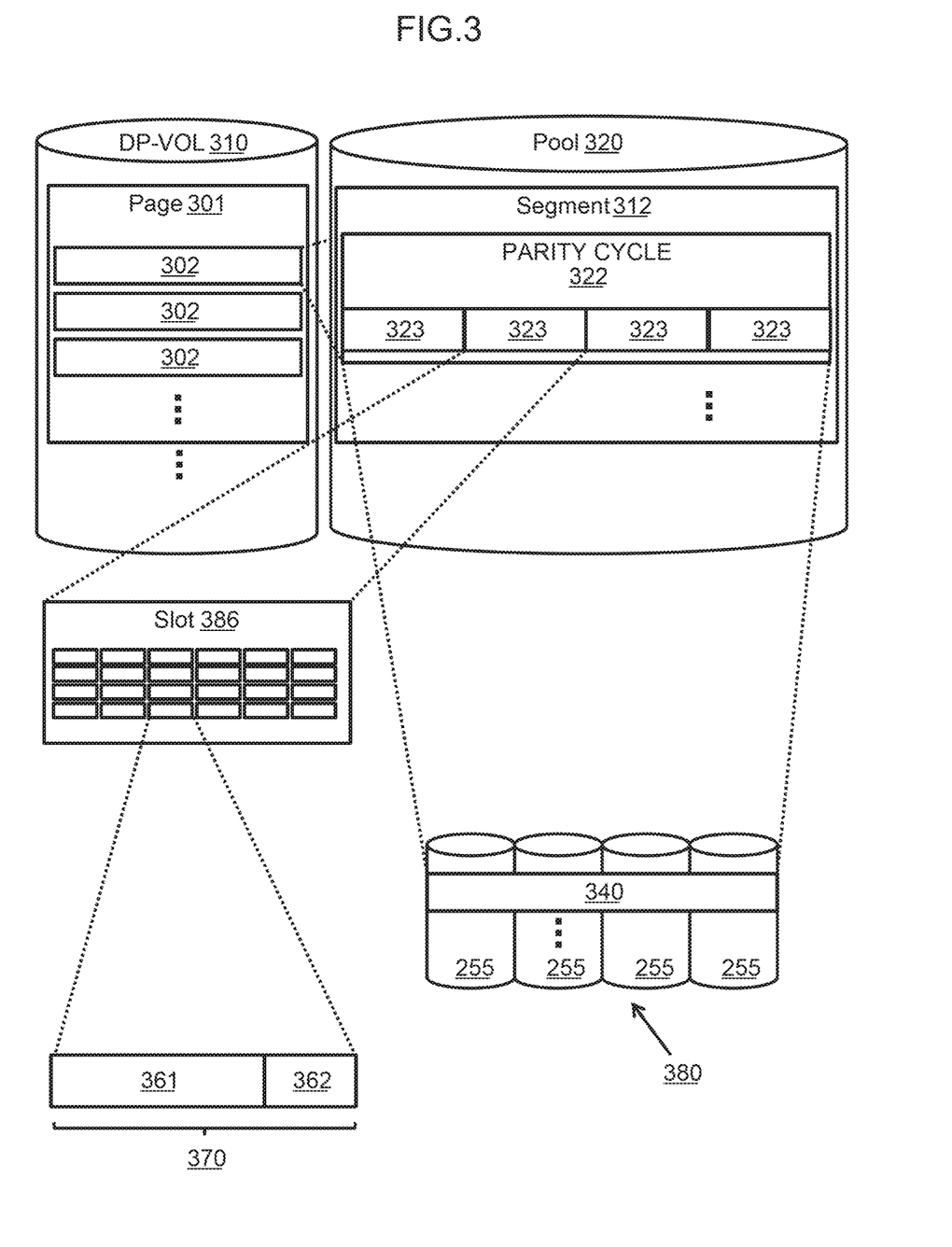
FIG. 3 is a schematic diagram showing the relationships between a plurality of storage areas in the storage system.

FIG. 3 shows relationships of a plurality of storage areas in the storage system 100.

There is one or more RAID groups 380. The RAID groups 380 are configured from two or more NVRAM 255. Logical storage areas based on the RAID groups 380 are configured from a plurality of stripes 340. A 'stripe' is a storage area which is configured from two or more strips which each exist in two or more NVRAM 255 in the RAID group 380. A 'strip' is a portion of the storage area of the NVRAM 255. A strip stores data or a parity.

A pool 320 is created based on logical storage areas which are based on one or more RAID groups 380. The pool 320 is an example of a back-end logical storage area and is configured from a plurality of segments 312. A plurality of parity cycles 322 belong to each segment 312. The parity cycles 322 are areas which correspond to one or more stripes 340. In this embodiment, one parity cycle 322 corresponds to one stripe 340 and consequently one partial parity cycle 323 corresponds to one strip. The pool 320 is an example of a logical storage area based on the storage apparatus 120 and the parity cycles 322 are an example of sub-logical storage areas. Note that associated with a partial parity cycle 323 is any slot 386 among a plurality of slots 386 (storage areas) which constitute the cache memory in the memory 213. The data stored in a partial parity cycle 323 is temporarily stored in the slot 386 which is associated with that partial parity cycle 323. One or more data sets 370 are stored in the slot 386. As described hereinabove, the data set 370 is a set of data 361 and additional information 362. Further, when the pool 320 has been created, Pool-LA are written in background format to each unit area in the pool 320.

A DP-VOL 310 is an example of a front-end (online) logical volume which is provided in the host system 260. The DP-VOL 310 is configured from a plurality of pages 301. When writing to a page 301 to which a segment 312 has not been allocated occurs, any segment 312 which has not been allocated to any page 301 is allocated to this page 301. In this embodiment, it is assumed that one segment 312 is allocated to one page 301. A plurality of partial pages 302 which each correspond to a plurality of parity cycles 322 belonging to a segment 312 belong, via the segment 312, to the page 301 to which the segment 312 has been allocated.

Figure 4:
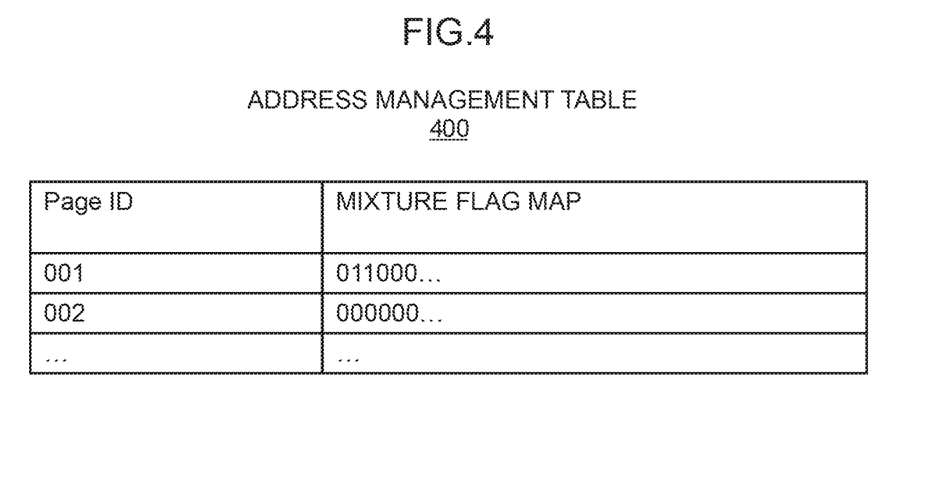
FIG. 4 is a diagram showing a configuration of an address management table.

FIG. 4 shows a configuration of an address management table.

An address management table 400 comprises a mixture flag for each of a plurality of parity cycles 322. For each of the parity cycles 322, the mixture flag is an example of information (mixed state information) indicating whether DP-LA and Pool-LA are mixed in that parity cycle 322. If the mixture flag corresponding to the parity cycle 322 containing the storage area which is the read source of the read-target data set indicates that a mixture is present ("1," for example), the aforementioned all-type LA check is performed. However, if the mixture flag indicates that no mixture is present ("0," for example), the all-type LA check is unnecessary. In other words, an LA check of only the DP-LA to determine whether the LA in the read-target data set matches the DP-LA corresponding to the read source (hereinafter a single-type LA check) may be carried out. Thus, whether an all-type LA check is necessary can be determined by referring to the mixture flag and if an all-type LA check is unnecessary, a single-type LA check for DP-LA is performed. Consequently, the frequency of all-type LA checks can be reduced and thus I/O performance improvements can be expected.

Note that a mixture flag exists for each unit larger than the unit areas (data sets), for example in every parity cycle 322. Therefore, even when new information such as a mixture flag is provided, expansion of the address management table 400 can be avoided.

More specifically, the address management table 400 comprises an entry for each page 301 and each entry stores a page ID (identification information of the page 301) and a mixture flag map. In each entry, the mixture flag map is two or more mixture flags which each correspond to two or more parity cycles 322 belonging to a segment 312 that has been allocated to the page 301 which corresponds to the entry. The mixture flag map is a bitmap, for example, and each bit is a mixture flag. The address management table 400 is configured in this way and therefore even when new information such as a mixture flag is provided, expansion of the address management table 400 (page management table) can be avoided.

An example of the processing performed in this embodiment will be explained hereinbelow. Note that although the details have been omitted in the ensuring explanation, data set I/Os to/from the storage apparatus 120 (NVRAM 255) are made by using the Pool-LA corresponding to the I/O destination DP-LA of the data set (the Pool-LA specified based on the address translation table 111).

Figure 5:
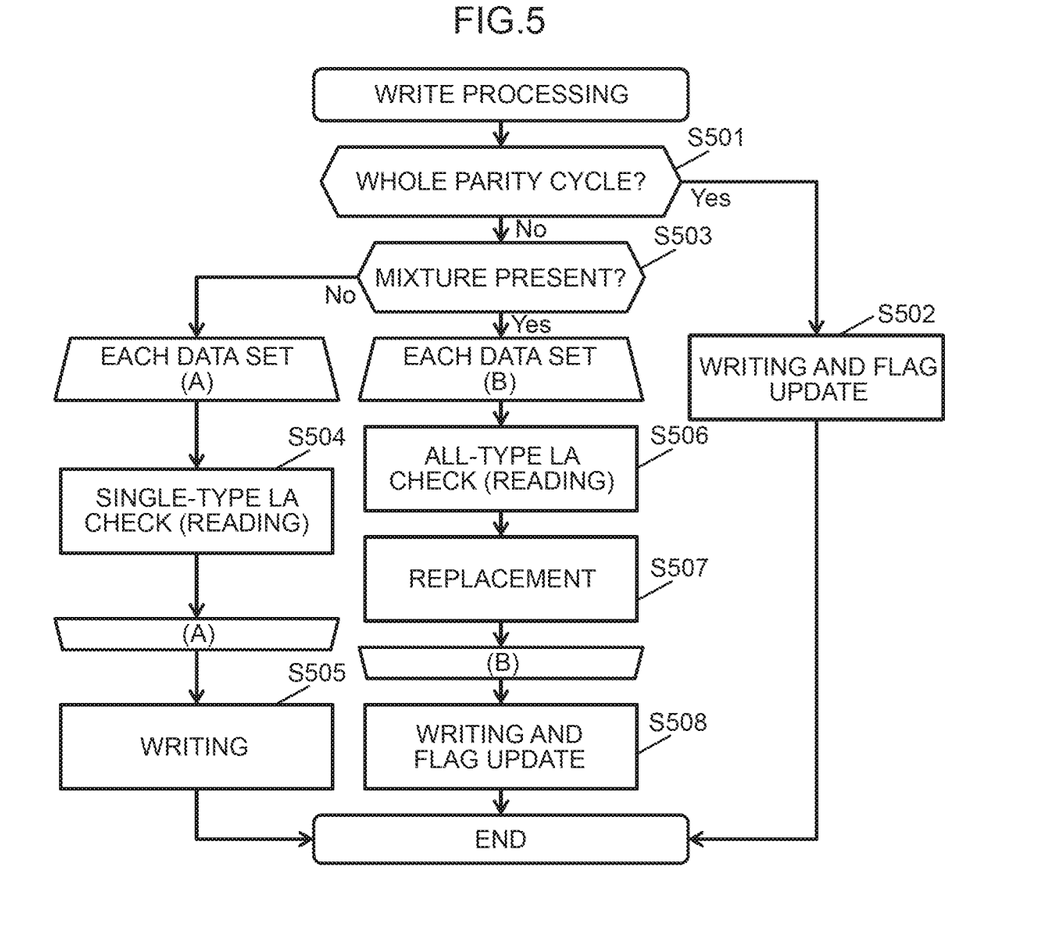
FIG. 5 is a diagram showing the flow of write processing.

FIG. 5 shows the flow of write processing.

In S501, the I/O request control unit 144 receives a write request. The I/O request control unit 144 determines whether the writing of the write request is for the whole parity cycle 322. If the cache memory has data equivalent to the whole parity cycle 322 including the data according to the write request, the result of the determination of S501 is true.

When the result of the determination of S501 is true (S501: Yes), writing is performed for the whole parity cycle 322 in S502. More specifically, the I/O request control unit 144 instructs the I/O control unit 141 to perform writing. The I/O control unit 141 writes a plurality of data sets equivalent to the whole parity cycle 322 to the pool 320 (more precisely, the parity cycle 322 which belongs to the segment 312 that has been allocated to the write destination page 301). The write destination DP-LA of the data in the data set is contained in each of the plurality of data sets. The I/O control unit 141 updates the mixture flag (the mixture flag in the address management table 400) which corresponds to the parity cycle 322 to no mixture present. The I/O control unit 141 returns complete (OK) to the I/O request control unit 144.

When the determination of S501 is false (S501: No), a so-called read-modify-write is performed for the whole parity cycle 322 to which the write destination belongs. The specific details are as per S503 to S508 below.

That is, in S503, it is determined whether a mixture is present for the write destination page 301. More specifically, the I/O request control unit 144 sends an inquiry about whether a mixture is present for page 301 to which the write destination DP-LA belongs, to the mixed state management unit 145. The mixed state management unit 145 refers to the entry which corresponds to this page 301 (the entry in the address management table 400) and determines whether there is one mixture flag indicating that a mixture is present in the mixture flag map in this entry. When the result of this determination is true, the mixed state management unit 145 returns a response that a mixture is present to the I/O request control unit 144. However, when the result of this determination is false, the mixed state management unit 145 returns a response that no mixture is present to the I/O request control unit 144. When the response returned is a response that a mixture is present, the result of the determination of S503 is true. When the response returned is a response that no mixture is present, the result of the determination of S503 is false. Note that the determination of whether a mixture is present is thus performed in page units. For this reason, as mentioned earlier, an expansion of the address management table 400 can be avoided even when new information such as a mixture flag is provided. However, because the units (pages) for determining whether a mixture is present are larger than mixture flag units (parity cycles), a response to the effect that a mixture is present is highly likely. Therefore, at least one (all in this embodiment) of the following is performed so that an increase in the mixture flags indicating that no mixture is present is promoted and, as a result, the frequency of an all-type LA check decreases and I/O performance improvements can thus be expected.

If the write target data has been stored in the cache memory for the whole parity cycle 322, writing is performed to the storage apparatus 120.

When write target data exists for a portion of the parity cycle 322, a so-called read-modify-write is performed for the whole parity cycle 322.

Even when read target data is for a portion of the parity cycle 322, reading is performed for the whole parity cycle 322, and if the LA in the data set thus read is a Pool-LA, same is replaced with a DP-LA and data set writing following LA replacement is performed for the whole of the parity cycle 322.

When the microprogram of 291 has a low load, reading, LA replacement and writing are performed for the whole parity cycle 322 which corresponds to the mixture flag indicating that a mixture is present.

When the result of the determination of S503 is false (S503: No), a single-type LA check is performed in the parity cycle 322 in S504 for each read-target data set in the read-modify-write. An example of one data set is as follows ('target data set' at this stage). That is, the I/O request control unit 144 sends an LA request (DP-LA request) in which the write destination DP-LA is designated to the LA management unit 146. In response to the LA request, the LA management unit 146 acquires the DP-LA which matches the designated DP-LA from the address translation table 111 and returns the acquired DP-LA to the I/O request control unit 144. The I/O request control unit 144 sends a read instruction in which the DP-LA is designated to the I/O control unit 141. In response to the read instruction, the I/O control unit 141 sends an LA check instruction in which the DP-LA is designated to the NVRAM 255 where the target data set is stored. In response to the LA check instruction, the NVRAM 255 performs a single-type LA check to determine whether the designated DP-LA matches the DP-LA in the target data set and replies to the I/O control unit 141 with the result of the single-type LA check. If the result of the single-type LA check is a match (OK), the I/O control unit 141 reads the target data set from the NVRAM 255 and returns the target data set to the I/O request control unit 144. The target data set is stored in the cache memory. Note that, in step S504, the single-type LA check may be performed by the LA checking unit 142 in place of the NVRAM 255. For example, the I/O control unit 141 may read the target data set from the NVRAM 255 and send the LA check instruction designating the DP-LA to the LA checking unit 142 instead of the NVRAM 255. The LA checking unit 142 may perform a single-type LA check for the LA in the target data set thus read.

In S505, a portion of the data in the cache memory is updated to the write target data (if there is parity, the parity is also updated), and a plurality of data sets (data sets equivalent to the whole parity cycle 322) are written to the pool 320 (parity cycle 322) by the I/O control unit 141. Note that the mixture flag corresponding to the parity cycle 322 already indicates that no mixture is present and hence the mixture flag need not be updated.

When the determination of S503 is true (S503: Yes), an all-type LA check is performed on the parity cycle 322 in S506 for each read target data set in the read-modify-write. An example of one data set is as follows ('target data set' at this stage). That is, the I/O request control unit 144 sends an LA request (a request for DP-LA and Pool-LA) designating the write destination DP-LA to the LA management unit 146. In response to the LA request, the LA management unit 146 acquires the DP-LA and Pool-LA which match the designated DP-LA from the address translation table 111 and returns the acquired DP-LA and Pool-LA to the I/O request control unit 144. The I/O request control unit 144 sends a read instruction in which the DP-LA and Pool-LA are designated to the I/O control unit 141. In response to the read instruction, the I/O control unit 141 reads the target data set from the NVRAM 255. Furthermore, the I/O control unit 141 sends an LA check instruction in which the DP-LA and Pool-LA are designated to the LA checking unit 142. The LA checking unit 142 performs an all-type LA check to determine whether the LA in the target data set matches one of the designated DP-LA and Pool-LA. The LA checking unit 142 returns the result of the all-type LA check to the I/O control unit 141. Note that when a match is obtained in the all-type LA check and the LA in the target data set matches the Pool-LA, in S507 the Pool-LA in the target data set is replaced with the DP-LA among the designated DP-LA and Pool-LA. More specifically, the LA checking unit 142 or I/O control unit 141 sends a replacement instruction to the replacement control unit 143. In response to the replacement instruction, the replacement control unit 143 replaces the Pool-LA in the target data set with the DP-LA among the designated DP-LA and Pool-LA. The replacement control unit 143 returns a replacement completion notification to the replacement instruction transmission source.

In S508, a portion of the data in the cache memory is updated to the write target data (if there is parity, the parity is also updated), and a plurality of data sets (data sets equivalent to the whole parity cycle 322) are written to the pool 320 (parity cycle 322) by the I/O control unit 141. The I/O control unit 141 updates the mixture flag (the mixture flag in the address management table 400) which corresponds to the parity cycle 322 to no mixture present.

Figure 6:
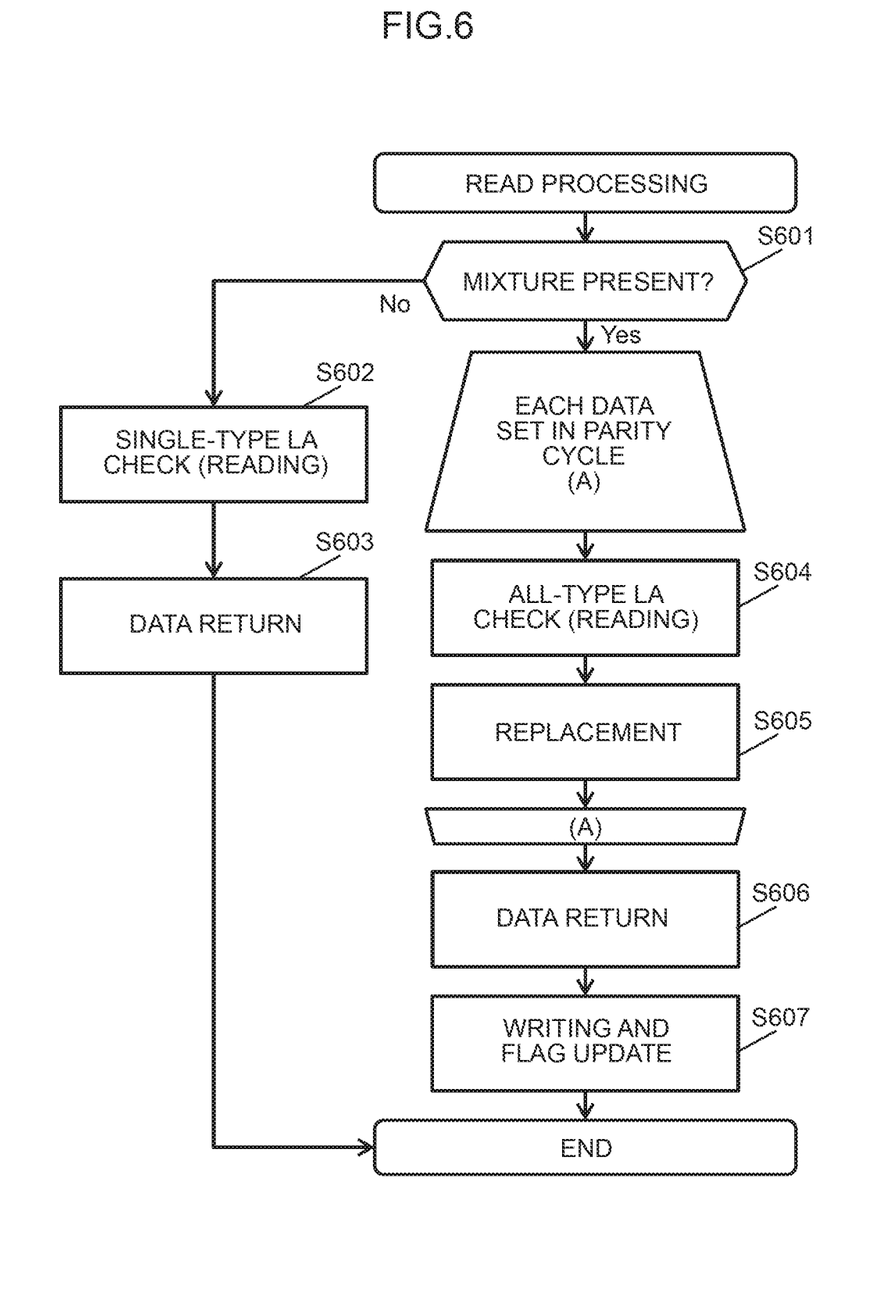
FIG. 6 is a diagram showing the flow of read processing.

FIG. 6 shows the flow of read processing.

In S601, the I/O request control unit 144 receives a read request. It is determined whether a mixture is present for the page 301 to which the read source DP-LA belongs. More specifically, the I/O request control unit 144 sends an inquiry about whether a mixture is present for the page 301 to the mixed state management unit 145. The mixed state management unit 145 refers to the entry which corresponds to this page 301 (the entry in the address management table 400) and determines whether there is one mixture flag indicating that a mixture is present in this entry. The mixed state management unit 145 returns a response according to the result of this determination to the I/O request control unit 144. When the response returned is a response that a mixture is present, the result of the determination of S601 is true. When the response returned is a response that no mixture is present, the result of the determination of S601 is false.

When the result of the determination of S601 is false (S601: No), a single-type LA check is performed on the read target data set in S602. Note that the processing of S602 is the same as the processing of S504 described earlier except for the fact that the write destination DP-LA is the read source DP-LA. In S603, the data set which has been read by the I/O control unit 141 is returned by the I/O request control unit 144 to the I/O request transmission source.

When the result of the determination of S601 is true (S601: Yes), an all-type LA check is performed in S604 for each data set in the parity cycle 322 to which the read source DP-LA belongs. An example of one data set is as follows ('target data set' at this stage). That is, the I/O request control unit 144 sends an LA request (a request for DP-LA and Pool-LA) designating the read source DP-LA to the LA management unit 146. In response to the LA request, the LA management unit 146 acquires the DP-LA and Pool-LA which match the designated DP-LA from the address translation table 111 and returns the acquired DP-LA and Pool-LA to the I/O request control unit 144. The I/O request control unit 144 sends a read instruction in which the DP-LA and Pool-LA are designated to the I/O control unit 141. In response to the read instruction, the I/O control unit 141 reads the target data set from the NVRAM 255. Furthermore, the I/O control unit 141 sends an LA check instruction in which the DP-LA and Pool-LA are designated to the LA checking unit 142. The LA checking unit 142 performs an all-type LA check to determine whether the LA in the target data set matches one of the designated DP-LA and Pool-LA. The LA checking unit 142 returns the result of the all-type LA check to the I/O control unit 141. Note that when a match is obtained in the all-type LA check and the LA in the target data set matches the Pool-LA, in S605 the Pool-LA in the target data set is replaced with the DP-LA among the designated DP-LA and Pool-LA. More specifically, the LA checking unit 142 or I/O control unit 141 sends a replacement instruction to the replacement control unit 143. In response to the replacement instruction, the replacement control unit 143 replaces the Pool-LA in the target data set with the DP-LA among the designated DP-LA and Pool-LA. The replacement control unit 143 returns a replacement completion notification to the replacement instruction transmission source.

In S606, among the data sets in the cache memory (the data sets equivalent to a whole parity cycle 322), the data in the data set according to the read request is returned by the I/O request control unit 144 to the read request transmission source. In S607, the I/O control unit 141 writes data sets equivalent to the whole parity cycle 322 to the pool 320 and updates the mixture flag corresponding to the parity cycle 322 (the mixture flag in the address management table 400) to no mixture present.

Thus, in read processing, the data set which contains the post-replacement DP-LA is written as the post-update data set of the data set containing the pre-replacement Pool-LA. That is, in addition to write processing, the Pool-LA in the storage apparatus 120 can be changed to a DP-LA even in read processing. Consequently, a further drop in the frequency of all-type LA checks can be expected.

Figure 7:
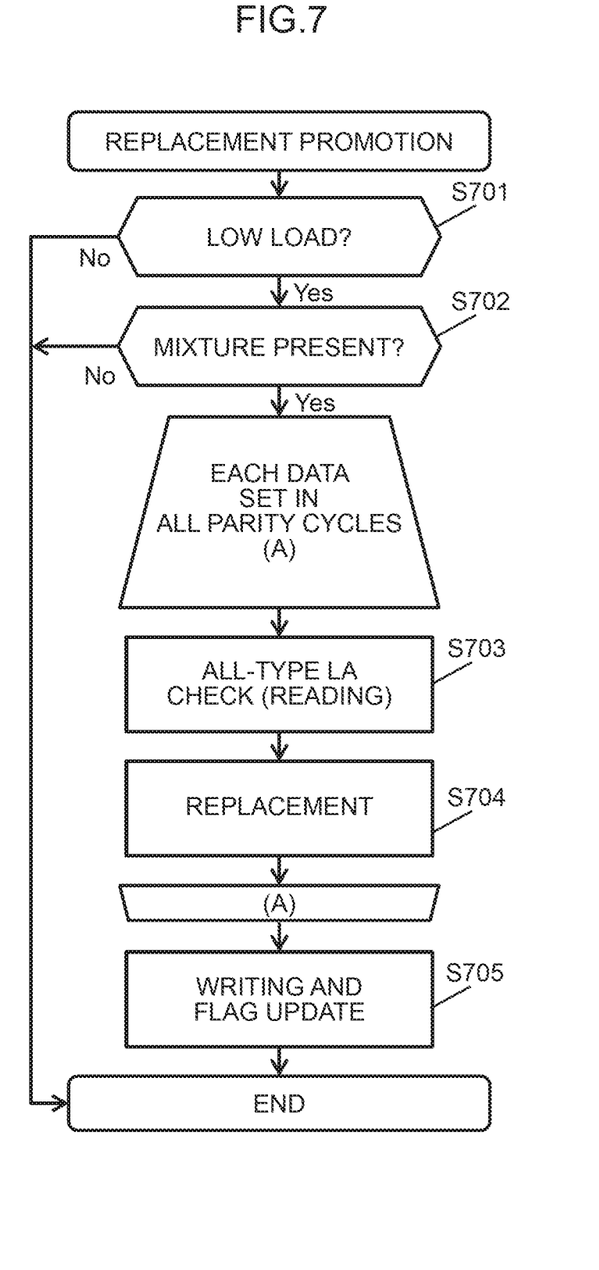
FIG. 7 is a diagram showing an example of replacement promotion.

FIG. 7 shows an example of the replacement promotion. The processing illustrated in FIG. 7 is started periodically, for example. Note that 'replacement promotion' involves updating a mixture flag to no mixture present by replacing Pool-LA with DP-LA in mixed flag units (parity cycle units) if LA in the data sets of the storage apparatus 120 are Pool-LA, and consequently reducing the frequency of all-type LA checks.

In S701, whether the load on the microprogram 291 is below a threshold is determined by the I/O request control unit 144, for example.

When the result of the determination of S701 is true (S701: Yes), in S702 it is determined whether a mixture is present for a certain page 301 (for example, the page 301 following the page 301 which was targeted in the previous processing of FIG. 7). This determination is similar to S601.

When the result of the determination of S702 is true (S702: Yes), an all-type LA check is performed in S703 for each of the data sets in all of the parity cycles 322 which belong to the certain page 301. S703 is similar to S604. If necessary, S704 is performed and S704 is similar to S605.

In S705, the I/O control unit 141 writes data sets in the cache memory (all the data sets in each of the parity cycles 322 in the foregoing certain page 301) to the pool 320 and updates each mixture flag which indicates that a mixture is present in the page 301 to no mixture is present.

The foregoing is an example of the processing performed in this embodiment.

As described earlier, if I/O (writing and reading and so forth) are performed in mixture flag units, before long the LA in the data sets in the storage apparatus 120 will match the DP-LA, that is, there will no longer be a mixture of LA.

Furthermore, according to this embodiment, a mixture flag is prepared for each parity cycle. Consequently, an efficient reduction of the frequency of all-type LA checks can be expected. More specifically, for example, at least one of the following may apply.

Writing is performed proactively in parity cycle units with the objective of lightening the parity update load and so forth.

When a portion of the parity cycle is updated, a read-modify-write is performed for the parity cycle.

Even when a portion of the parity cycle is a read source, reading is performed for the whole parity cycle.

When the storage control system 110 comprises a deduplication function which removes duplicate data in the storage apparatus 120, the deduplication is performed in parity cycle units.

When data copying (replication or migration) occurs due to replacement of the storage system 100, or the like, so-called sequential I/O is generated. In sequential I/O, I/O is performed in parity cycle units.

An embodiment was explained hereinabove but is an example to explain the present invention, there being no intention to limit the scope of the present invention to this embodiment alone. The present invention can also be executed in a variety of other forms.

For example, instead of or in addition to mapping between DP-LA and Pool-LA, the present invention can also be applied to other mapping between addresses (for example, mapping between different addresses in the same layer (between different storage areas)).

Moreover, when a match is not obtained for at least one of an all-type LA check and a single-type LA check, for example, processing according to an I/O request may be suspended and predetermined error processing may be executed, or the processing according to the I/O request may be performed again.

What is claimed is:

1. A storage control system, comprising:
    an I/O control unit which reads a data set from a storage apparatus if necessary in response to an I/O (Input/Output) request;
    an address checking unit which performs an all-type address check which is a check to determine whether one of a first address and second address which correspond to a read-target data set in address translation information, which is information indicating a mapping relationship between one or more first addresses and one or more second addresses, matches the address among the data and address contained in the data set; and
    a replacement control unit which, when a result of the all-type address check is true and if the matching address is any second address, replaces the second address contained in the read-target data set with a first address which corresponds to the second address,
    wherein the result of the all-type address check is true when one of the first address and second address matches the address among the data and address contained in the data set
    wherein the one or more first addresses are each an address which belongs to the first address type,
    wherein the one or more second addresses are each an address which belongs to the second address type,
    wherein processing according to the I/O request is performed when the result of the all-type address check is true, and
    wherein the I/O control unit writes a data set, which contains data that is contained in the read-target data set and the first address which is the address after replacing the second address contained in the read-target data set, to the storage apparatus as a data set after updating the read-target data set.

2. The storage control system according to claim 1,
    wherein an address which belongs to the first address type and an address which belongs to the second address type are logical addresses,
    wherein a logical storage area based on the storage apparatus is configured from a plurality of sub-logical storage areas,
    wherein the plurality of sub-logical storage areas are each configured from two or more storage areas which each store two or more data sets,
    wherein the address checking unit refers to address management information which includes mixed state information which is information indicating, for each of the plurality of sub-logical storage areas, whether a first address and second address are mixed in the sub-logical storage area,
    wherein the all-type address check is performed if the mixed state information corresponding to the sub-logical storage area including the storage area which is the read source of the read-target data set indicates that a mixture is present,
    wherein a single-type address check, which is a check to determine whether the address in the read-target data set matches a first address which corresponds to the read source for only the first address type among the first address type and second address type, is performed by at least one of the address checking unit and the storage apparatus if the mixed state information corresponding to the sub-logical storage area including the storage area of the read source of the read-target data set indicates that no mixture is present.

3. The storage control system according to claim 2,
    wherein, when the I/O control unit performs reading of two or more data sets for the whole of a certain sub-logical storage area for which corresponding mixed state information indicates that a mixture is present, the address checking unit performs the all-type address check for each of the data sets read from the certain sub-logical storage area,
    wherein, if the result of the all-type address check is true and if there is a data set in which the matching address is any second address, the replacement control unit specifies a first address which corresponds to the second address from the address translation information and replaces the address contained in the data set with the specified first address, and
    wherein the I/O control unit writes two or more data sets after the processing by the address checking unit and replacement control unit to the certain sub-logical storage area and updates the mixed state information corresponding to the certain sub-logical storage area to information indicating that no mixture is present.

4. The storage control system according to claim 3,
    wherein the storage apparatus comprises one or more redundancy configuration groups,
    wherein the one or more redundancy configuration groups are each a storage device group which is configured from two or more storage devices and which stores redundant data, and
    wherein, for each of the plurality of sub-logical storage areas, data in any storage area of the sub-logical storage area can be restored based on data in at least one storage area other than the storage area of the sub-logical storage area.

5. The storage control system according to claim 4,
    wherein the one or more redundancy configuration groups are one or more RAID (Redundant Array of Independent (or Inexpensive) Disks) groups,
    wherein the one or more RAID groups are each configured from a plurality of stripes based on two or more storage devices, and
    wherein the plurality of sub-logical storage areas are each parity cycles which are one or more stripes.

6. The storage control system according to claim 2,
    wherein the I/O control unit and the address checking unit are functions which are realized as a result of a microprogram being executed by a processor unit which is one or more processors, and wherein, when the load on the microprogram is less than a threshold, the I/O control unit performs reading of all data sets from sub-logical storage areas for which corresponding mixed state information indicates that a mixture is present.

7. The storage control system according to claim 2, further comprising:
an I/O request control unit which issues an inquiry in which a read source address is designated; and
a mixed state management unit which, in response to the inquiry, replies that a mixture is present or no mixture is present,
wherein the first address type is an address type to which each logical address, which belongs to a logical volume configured from a plurality of pages, belongs,
wherein the second address type is an address type to which each logical address, which belongs to a pool which is a logical storage area configured from a plurality of segments that can be allocated to the plurality of pages constituting the logical volume, belongs,
wherein one or more sub-logical storage areas belong to each of the plurality of segments,
wherein the address management information has an entry which includes, for each of the plurality of pages, mixed state information for each of two or more sub-logical storage areas which belong to one or more segments allocated to the page,
wherein the I/O request control unit issues the inquiry for the page to which the read source address belongs, and
wherein the mixed state management unit replies that a mixture is present if state management information, which corresponds to at least one sub-logical storage area to which one or more segments allocated to the page belong, indicates that a mixture is present.

8. The storage control system according to claim 2,
wherein the I/O control unit is configured to perform writing of a data set, which contains data according to a write request and a write destination address according to the write request, in sub-logical storage area units,
wherein the write destination address is an address which belongs to the first address type, and
wherein, for the writing, mixed state information corresponding to a sub-logical storage area of the write destination is information indicating that no mixture is present.

9. The storage control system according to claim 1,
wherein the second address type is an address type to which an address, which is written in each unit area in a format of the storage apparatus, belongs.

10. A storage control method, comprising:
reading a data set from a storage apparatus if necessary in response to an I/O (Input/Output) request;
performing an all-type address check which is a check to determine whether one of a first address and second address which correspond to a read-target data set in address translation information, which is information indicating a mapping relationship between one or more first addresses and one or more second addresses, matches the address among the data and address contained in the data set,
the one or more first addresses each being an address which belongs to the first address type, and
the one or more second addresses each being an address which belongs to the second address type;
replacing, when a result of the all-type address check is true and if the matching address is any second address, the second address contained in the read-target data set with a first address which corresponds to the second address; and
performing processing according to the I/O request when the result of the all-type address check is true, and
wherein the I/O control unit writes a data set, which contains data that is contained in the read-target data set and the first address which is the address after replacing the second address contained in the read-target data set, to the storage apparatus as a data set after updating the read-target data set.

11. A non-transitory computer-readable medium storing a computer program for controlling a storage control system which, when executed by a processor, causes the processor to:
read a data set from a storage apparatus if necessary in response to an I/O (Input/Output) request;
perform an all-type address check which is a check to determine whether one of a first address and second address which correspond to a read-target data set in address translation information, which is information indicating a mapping relationship between one or more first addresses and one or more second addresses, matches the address among the data and address contained in the data set,
the one or more first addresses each being an address which belongs to the first address type, and
the one or more second addresses each being an address which belongs to the second address type;
replace, when a result of the all-type address check is true and if the matching address is any second address, the second address contained in the read-target data set with a first address which corresponds to the second address; and
perform processing according to the I/O request when the result of the all-type address check is true, and
wherein the I/O control unit writes a data set, which contains data that is contained in the read-target data set and the first address which is the address after replacing the second address contained in the read-target data set, to the storage apparatus as a data set after updating the read-target data set.

* * * * *